United States Patent
Arend et al.

(10) Patent No.: US 9,328,839 B2
(45) Date of Patent: May 3, 2016

(54) HIGH-TEMPERATURE TORQUE MOTOR ACTUATOR

(71) Applicant: HONEYWELL INTERNATIONAL INC., Morristown, NJ (US)

(72) Inventors: Matt Arend, South Bend, IN (US); Donna Laboda, Niles, MI (US); Charles Walejewski, Mishawaka, IN (US); Sammuel Tillich, La Porte, IN (US); Larry Portolese, Granger, IN (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 193 days.

(21) Appl. No.: 14/150,139

(22) Filed: Jan. 8, 2014

(65) Prior Publication Data
US 2015/0192218 A1   Jul. 9, 2015

(51) Int. Cl.
| F16K 31/06 | (2006.01) |
| F16K 11/044 | (2006.01) |
| F16K 31/08 | (2006.01) |
| H02K 26/00 | (2006.01) |

(52) U.S. Cl.
CPC ........... *F16K 31/0627* (2013.01); *F16K 11/044* (2013.01); *F16K 31/0679* (2013.01); *F16K 31/082* (2013.01); *H02K 26/00* (2013.01); *Y10T 137/86815* (2015.04)

(58) Field of Classification Search
CPC ............ F16K 31/0627; F16K 31/0679; F16K 31/082; F16K 11/044; H02K 33/16; F15B 13/0438; F15B 13/0431; F15B 13/043; Y10T 137/86815; Y10T 137/86598
USPC .............................. 137/625.4, 625.62; 251/65
See application file for complete search history.

(56) References Cited

U.S. PATENT DOCUMENTS

| 2,924,241 A | * | 2/1960 | Bauer | ................ F15B 13/0431 137/549 |
| 2,962,611 A | * | 11/1960 | Atchley | .................. H01F 7/14 310/29 |
| 3,081,787 A | * | 3/1963 | Meulendyk | ......... F15B 13/0436 137/625.68 |
| 3,209,782 A | * | 10/1965 | Wolpin | ............... F15B 13/0438 137/625.62 |
| 3,377,882 A | | 4/1968 | Schrempp | |
| 3,777,784 A | * | 12/1973 | Nicholson | ........... F15B 13/0431 137/625.62 |
| 3,878,412 A | * | 4/1975 | Kurpanek | .............. H01H 51/10 173/117 |
| 3,910,314 A | * | 10/1975 | Nicholson | .......... F15B 13/0431 137/625.62 |

(Continued)

OTHER PUBLICATIONS

Liu, Chein-Shan; Elastic Torsion Bar with Arbitrary Cross-Section Using the Fredholm Integral Equations; CMC, vol. 5, No. 1, pp. 31-42, 2007; Copyrightc 2007 Tech Science Press.

*Primary Examiner* — John Bastianelli
(74) *Attorney, Agent, or Firm* — Ingrassia Fishe & Lorenz, P.C.

(57) ABSTRACT

A torque motor valve actuator includes a first magnetic pole piece, a second magnetic pole piece, an armature, and a coil. The first magnetic pole piece is of a first magnetic polarity. The second magnetic pole piece is of a second magnetic polarity, and is spaced apart from the first magnetic pole piece to define a gap. The armature is rotationally mounted and disposed in the gap between the first and second magnetic pole pieces. The coil surrounds at least a portion of the armature and is disposed such that it is not surrounded by either the first magnetic pole piece or the second magnetic pole piece. The coil is adapted to receive electric current and is configured, upon receipt thereof, to generate a magnetic force that causes the armature to rotate.

15 Claims, 3 Drawing Sheets

(56) References Cited

U.S. PATENT DOCUMENTS

| | | | | |
|---|---|---|---|---|
| 4,378,031 A | * | 3/1983 | Nicholson | F15B 13/0436 137/625.63 |
| 4,560,969 A | * | 12/1985 | Nicholson | H01F 7/14 137/625.64 |
| 4,794,941 A | * | 1/1989 | Godon | F15B 13/0438 137/625.64 |
| 4,997,002 A | * | 3/1991 | Blatter | F15B 13/043 137/625.62 |
| 5,184,645 A | * | 2/1993 | Boerschig | F15C 3/14 137/625.25 |
| 5,465,757 A | | 11/1995 | Peters | |
| 5,697,401 A | * | 12/1997 | Shinoda | F15B 13/0438 137/625.62 |
| 6,321,767 B1 | | 11/2001 | Seid et al. | |
| 7,795,538 B2 | | 9/2010 | Kaiser et al. | |
| 8,485,201 B2 | | 7/2013 | Wyatt et al. | |
| 8,505,573 B2 | | 8/2013 | Herbert et al. | |
| 8,572,838 B2 | | 11/2013 | Piascik et al. | |
| 2006/0273539 A1 | | 12/2006 | Barth et al. | |
| 2008/0116882 A1 | * | 5/2008 | Taylor | G01D 3/036 324/207.15 |
| 2010/0156580 A1 | | 6/2010 | Bill et al. | |
| 2013/0048891 A1 | | 2/2013 | Druhan et al. | |

* cited by examiner

HIGH-TEMPERATURE TORQUE MOTOR ACTUATOR

TECHNICAL FIELD

The present invention generally relates to torque motor actuators, and more particularly relates to a torque motor actuator that can withstand relatively high temperatures.

BACKGROUND

Torque motor actuators are used in myriad systems and environments. For example, many engine air valves associated with an aircraft gas turbine engine are controlled using torque motor actuators. No matter the specific end-use system and environment, a typical torque motor actuator includes a plurality of coils, an armature, and a flapper. The coils are controllably energized to control the rotational position of the armature, which is coupled to a valve element, such as a flapper. By controlling the rotational position of the armature, the position of the flapper relative to one or more fluid outlets is controlled and thus fluid pressure and/or flow to a fluid controlled device is controlled.

In many instances, aircraft engine air valves are mounted near the engine. Due to the relatively high temperatures near the engine, the torque motor actuators associated with the air valves are remotely mounted. This remote mounting can increase the overall cost and complexity of the system.

Hence, there is a need for a torque motor actuator that can operate at relatively high temperatures and thus be mounted directly to the air valves. The present invention addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a torque motor valve actuator includes a first magnetic pole piece, a second magnetic pole piece, an armature, and a coil. The first magnetic pole piece is of a first magnetic polarity. The second magnetic pole piece is of a second magnetic polarity, and is spaced apart from the first magnetic pole piece to define a gap. The armature is rotationally mounted and disposed in the gap between the first and second magnetic pole pieces. The coil surrounds at least a portion of the armature and is disposed such that it is not surrounded by either the first magnetic pole piece or the second magnetic pole piece. The coil is adapted to receive electric current and is configured, upon receipt thereof, to generate a magnetic force that causes the armature to rotate.

In another embodiment, a torque motor valve actuator includes an actuator housing, a first magnetic pole piece, a second magnetic pole piece, an armature, an armature spring, and a coil. The first magnetic pole piece is of a first magnetic polarity and is mounted within the actuator housing. The second magnetic pole piece is of a second magnetic polarity, is mounted within the actuator housing, and is spaced apart from the first magnetic pole piece to define a gap. The armature is rotationally mounted within the actuator housing and is disposed in the gap between the first and second magnetic pole pieces. The armature spring is coupled to the armature and is configured to bias the armature to a null position. The coil is mounted within the actuator housing and surrounds at least a portion of the armature. The coil is disposed such that it is not surrounded by either the first magnetic pole piece or the second magnetic pole piece, and is adapted to receive electric current and is configured, upon receipt thereof, to generate a magnetic force that causes the armature to rotate.

In yet another embodiment, a valve assembly includes a valve housing, a first nozzle, a second nozzle, a flapper element, and a torque motor. The first nozzle is disposed within the valve housing. The second nozzle is disposed within the valve housing and is spaced apart from the first nozzle. The flapper element is disposed between the first and second nozzles. The torque motor valve actuator is coupled to the valve housing and is configured to move the flapper element to selectively engage one of the first or second nozzles. The torque motor valve actuator includes a first magnetic pole piece, a second magnetic pole piece, an armature, and a coil. The first magnetic pole piece is of a first magnetic polarity. The second magnetic pole piece is of a second magnetic polarity, and is spaced apart from the first magnetic pole piece to define a gap. The armature is rotationally mounted, is disposed in the gap between the first and second magnetic pole pieces, and is coupled to the flapper element. The coil surrounds at least a portion of the armature and is disposed such that it is not surrounded by either the first magnetic pole piece or the second magnetic pole piece. The coil is adapted to receive electric current and is configured, upon receipt thereof, to generate a magnetic force that causes the armature to rotate and thereby move the flapper element.

Furthermore, other desirable features and characteristics of the torque motor actuator and valve will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
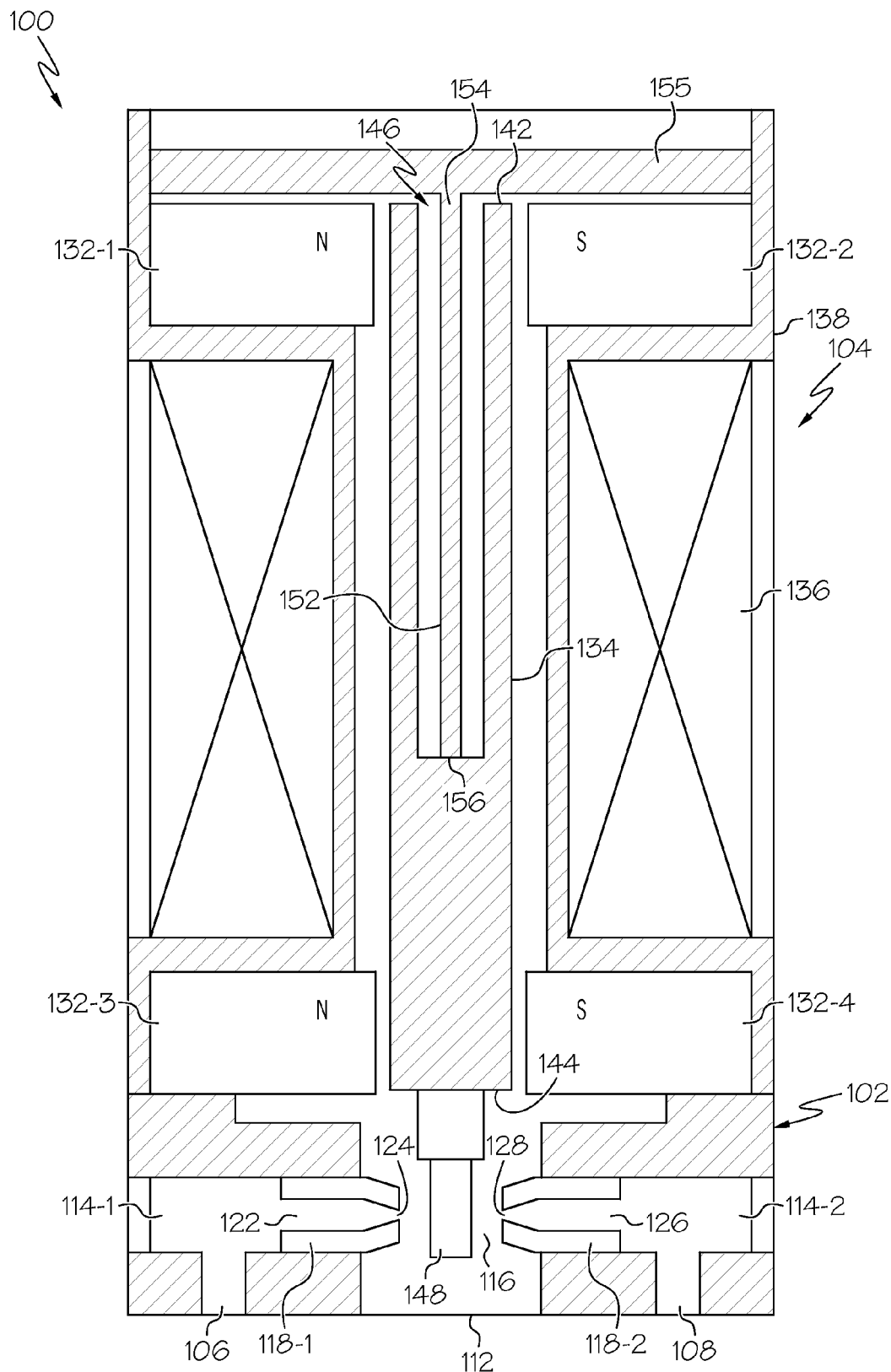
FIG. 1 depicts a cross section view of one embodiment of a valve assembly.

Referring to FIG. 1, a cross section view of one embodiment of a valve assembly 100 is depicted. The depicted valve assembly 100 is a single-stage electro-hydraulic servo-valve (EHSV) and includes a valve housing 102 and a torque motor valve actuator 104. The valve housing 102 includes a first housing inlet 106, a second housing inlet 108, and a housing outlet 112. The first housing inlet 106 and the second housing inlet 108 are each adapted to be coupled in fluid communication with a pressurized fluid source (not illustrated). It will be appreciated that the pressurized fluid medium may vary, and may be any one of numerous gaseous or liquid media. The housing outlet 112 is adapted to be coupled in fluid communication with a pressurized fluid load, such as, for example, a pneumatic or hydraulic valve.

The valve housing 102 additionally includes two nozzle cavities—a first nozzle cavity 114-1 and a second nozzle cavity 114-2—and a flapper plenum 116. The first nozzle cavity 114-1 is in fluid communication with the first housing inlet 106 and the flapper plenum 116, and the second nozzle cavity 114-2 is in fluid communication with the second housing inlet 108 and the flapper plenum 116. The flapper plenum 116, which is disposed perpendicular to the first and second nozzle cavities 114-1, 114-2, is in fluid communication with the housing outlet 112.

Two nozzles 118, which are referred to herein as a first nozzle 118-1 and a second nozzle 118-2, are mounted within the housing 102. More specifically, the first nozzle 118-1 is mounted within the first nozzle cavity 114-1, and the second nozzle 118-2 is mounted within the second nozzle cavity 114-2. The first nozzle 118-1 includes a first nozzle inlet 122 and a first nozzle outlet 124, and the second nozzle 118-2 includes a second nozzle inlet 126 and a second nozzle outlet 128. The first nozzle 118-1 is configured such that the first nozzle inlet 122 is in fluid communication with the first housing inlet 106, and the first nozzle outlet 124 is disposed within the flapper plenum 116. The second nozzle 118-2 is configured such that the second nozzle inlet 126 is in fluid communication with the second housing inlet 108, and the second nozzle outlet 128 is disposed within the flapper plenum 116. Fluid flow through the first and second nozzles 118-1, 118-2, into the flapper plenum 116, and out the housing outlet 112 is controlled via the torque motor valve actuator 104, an embodiment of which will now be described.

The torque motor actuator 104 is coupled to the valve housing 102 and is adapted to be selectively energized. The torque motor valve actuator 104 is configured, upon being selectively energized, to selectively place the housing outlet 112 in fluid communication with either or both of the first nozzle outlet 124 and the second nozzle outlet 128. In the depicted embodiment, the torque motor valve actuator 104 includes a first magnetic pole piece 132-1, a second magnetic pole piece 132-2, an armature 134, and a coil 136, all of which are disposed within an actuator housing 138. The first and second magnetic pole pieces 132 are of opposite magnetic polarities, and are spaced apart from each other to define a gap. For example, if the first magnetic pole piece 132-1 is of a north (N) magnetic polarity, then the second magnetic pole piece 132-2 is of a south (S) magnetic polarity, and vice-versa.

It will be appreciated that the first and second magnetic pole pieces 132-1, 132-2 may be variously configured and implemented. For example, the first and second magnetic pole pieces 132-1, 132-2 may be coupled to, or form part of, a single permanent magnet. Alternatively, the first and second magnetic pole pieces 132-1, 132-2 may be coupled to, or form part of, separate magnets. For example, the first magnetic pole piece 132-1 may be coupled to, or form part of, a first permanent magnet, and the second magnetic pole piece 132-2 may be coupled to, or form part of, a second permanent magnet.

It is further noted that, at least in the depicted embodiment, the torque motor actuator 104 additionally includes third and fourth magnetic pole pieces 132-3, 132-4. The third and fourth magnetic pole pieces 132-3, 132-4 are also of opposite magnetic polarities, and are also spaced apart from each. Thus, like the first and second magnetic pole pieces 132-1, 132-2, if the third magnetic pole piece 132-3 is of a north (N) magnetic polarity, then the fourth magnetic pole piece 132-4 is of a south (S) magnetic polarity, and vice-versa.

It will be additionally be appreciated that the third and fourth magnetic pole pieces 132-3, 132-4, like the first and second magnetic pole pieces 132-1, 132-2, may be variously configured and implemented. For example, the third and fourth magnetic pole pieces 132-3, 132-4 may be coupled to, or form part of, a single permanent magnet. Alternatively, the third and fourth magnetic pole pieces 132-3, 132-4 may be part of separate magnets. For example, the third magnetic pole piece 132-3 may be coupled to, or form part of, a third permanent magnet, and the fourth magnetic pole piece 132-4 may be coupled to, or form part of, a fourth permanent magnet.

Regardless of the specific number, configuration, and implementation of magnetic pole pieces 132, the armature 134 is rotationally mounted and is disposed in the gap between the first and second magnetic pole pieces 132 (and the third and fourth magnetic pole pieces, if included). The depicted armature 132 includes a first end 142, a second end 144, and an opening 146 that extends from the first end 142 and partially into the armature 134. The second end 144 of the armature 134 is coupled to a flapper element 148, which is disposed in the flapper plenum 116 between the first and second nozzles 118-1, 118-2.

An armature spring 152 extends into the opening 146 and is coupled to the armature 134. The armature spring 152 is configured to bias the armature to a null position, which is the position depicted in FIG. 1. The armature spring 152 may be variously implemented, but in the depicted embodiment it is a beam spring that includes a first end 154 and a second end 156. The first end 154 is fixedly coupled to a base 155 that is fixedly coupled to the actuator housing 138, and the second end 156 is fixedly coupled to the armature 134. Because the armature spring 152 is disposed within the armature 134, the design allows for more flexibility to optimize for operating stresses as compared to those associated with an externally disposed spring. This configuration also allows for using a relatively smaller and more efficient spring design. As a result, more of the magnetic flux that is generated by the coil 136 is used by the armature 134, resulting in increased efficiency in magnetic performance and reduced power requirements. This configuration also makes it easier to include the third and fourth pole pieces 132-3, 132-4, since the base 155 of the armature spring 152 is mounted at the top of the actuator housing 130. This provides an increased output force for the same input current, which also reduces power requirements.

The coil 136 surrounds at least a portion of the armature 134 and is disposed such that it is not surrounded by any of the magnetic pole pieces 132. The coil 136 is adapted to receive electric current and is configured, upon receipt of the electric current, to generate a magnetic force that causes the armature 134 to rotate and thereby move the flapper element 148. For example, as depicted in FIGS. 2 and 3, depending upon the direction of the supplied electric current flow, the coil 136 will generate a magnetic force that causes the armature to rotate in either a clockwise direction or a counter clockwise direction (from the perspective of FIGS. 2 and 3) to thereby place the housing outlet 112 in fluid communication with the first nozzle outlet 124 or the second nozzle outlet 128, respectively.

Because the coil 136 is disposed external to the magnetic pole pieces 132, it can be larger than the coils that are used in presently known torque motor actuators without increasing the size of components that are typically mounted around the coil, such as the magnetic pole pieces. As a result, relatively larger wire may be used, which reduces coil resistance. The coil 136 is also preferably formed of suitable wire and using winding techniques that allow it to withstand relatively high temperatures. For example, it may withstand temperatures greater than about 260° C. Some examples of suitable wire, such as anodized aluminum embedded in electrically insulative, high thermal expansion ceramic, and suitable winding techniques are disclosed in U.S. Pat. No. 8,572,838, the entirety of which is incorporated herein by reference.

Figure 2:
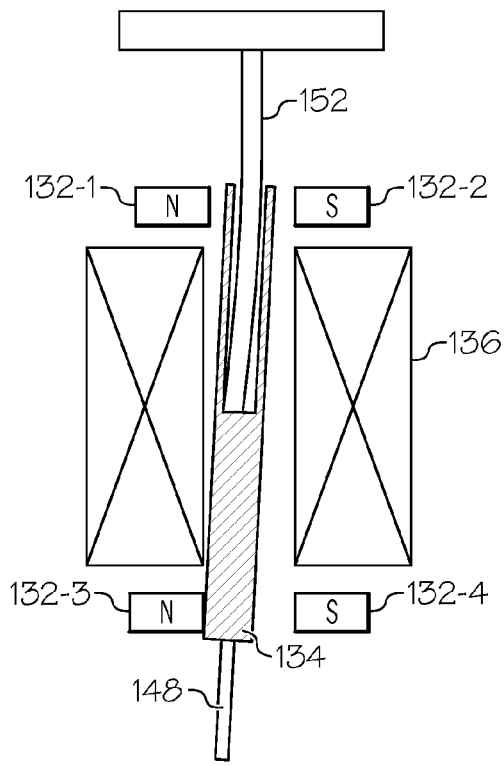
FIGS. 2 and 3 depict simplified representations of the valve assembly of FIG. 1 in two different positions.
Figure 3:
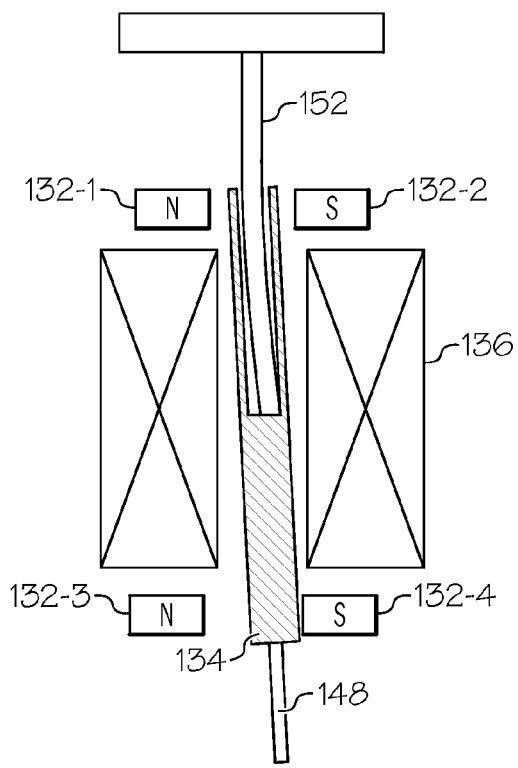
Figure 4:
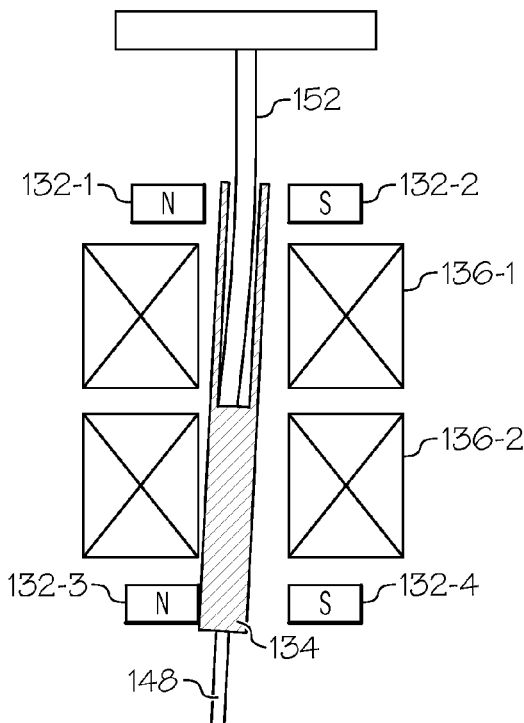
FIGS. 4 and 5 depict two different simplified representations of a dual-coil implementation of the valve assembly of FIG. 1.
Figure 5:
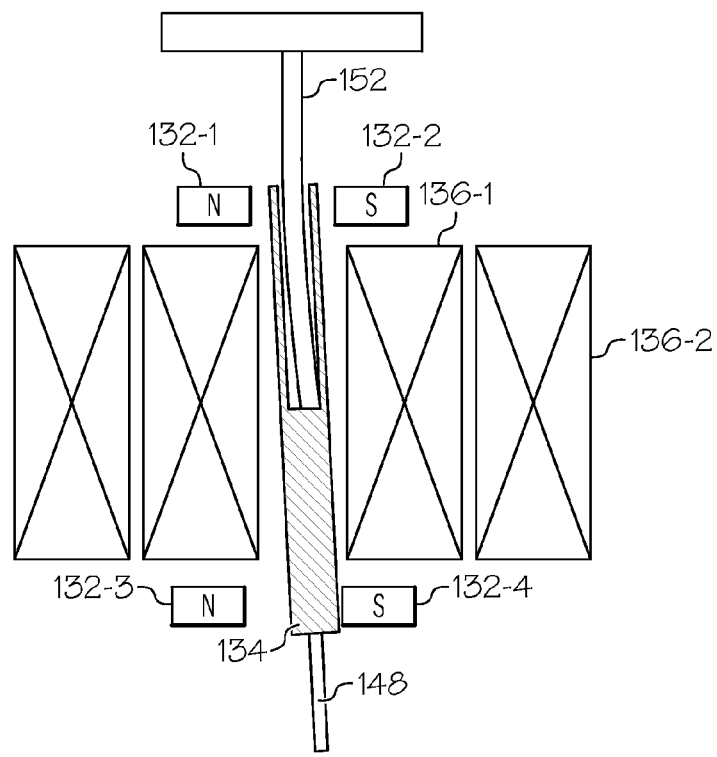

The embodiments depicted in FIGS. 1-3, the torque motor actuator 104 included only a single coil 136. It will be appreciated, however, that the torque motor actuator 104 could also be implemented with two or more coils. Two different embodiments of the torque motor actuator with two coils 136 (e.g., 136-1, 136-2) are depicted in FIGS. 4 and 5. In these embodiments, one of the coils may be implemented as a back-up in the event the primary coil becomes inoperative.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A torque motor valve actuator, comprising:
   a first magnetic pole piece of a first magnetic polarity;
   a second magnetic pole piece of a second magnetic polarity, the second magnetic pole piece spaced apart from the first magnetic pole piece to define a gap;
   a rotationally mounted armature disposed in the gap between the first and second magnetic pole pieces, the armature including a first end, a second end, and an opening that extends from the first end and partially into the armature;
   an armature spring coupled to the armature and extending into the opening, the armature spring configured to bias the armature to a null position; and
   a coil surrounding at least a portion of the armature and disposed such that it is not surrounded by either the first magnetic pole piece or the second magnetic pole piece, the coil adapted to receive electric current and configured, upon receipt thereof, to generate a magnetic force that causes the armature to rotate.

2. The actuator of claim 1, wherein the armature spring comprises a beam spring.

3. The actuator of claim 1, wherein the first magnetic pole piece and the second magnetic pole piece form a single permanent magnet.

4. The actuator of claim 1, wherein:
   the first magnetic pole piece is part of a first permanent magnet; and
   the second magnetic pole piece is part of a second permanent magnet.

5. The actuator of claim 1, further comprising:
   a third magnetic pole piece of the first magnetic polarity;
   a fourth magnetic pole piece of the second magnetic polarity, the fourth magnetic pole piece spaced apart from the third magnetic pole piece.

6. The actuator of claim 5, wherein:
   the first magnetic pole piece and the second magnetic pole piece form a first permanent magnet; and
   the third magnetic pole piece and the fourth magnetic pole piece form a second permanent magnet.

7. The actuator of claim 5, wherein:
   the first magnetic pole piece is part of a first permanent magnet;
   the second magnetic pole piece is part of a second permanent magnet;
   the third magnetic pole piece is part of a third permanent magnet; and
   the second magnetic pole piece is part of a fourth permanent magnet.

8. The actuator of claim 1, wherein the coil comprises anodized aluminum embedded in a ceramic.

9. The actuator of claim 1, wherein:
   the coil is a first coil; and
   the actuator further comprises a second coil disposed adjacent the first coil, the second coil surrounding at least a portion of the armature and disposed such that it is not surrounded by either the first magnetic pole piece or the second magnetic pole piece, the second coil adapted to receive electric current and configured, upon receipt thereof, to generate a magnetic force that causes the armature to rotate.

10. A torque motor valve actuator, comprising:
    an actuator housing;
    a first magnetic pole piece of a first magnetic polarity mounted within the actuator housing;
    a second magnetic pole piece of a second magnetic polarity mounted within the actuator housing, the second magnetic pole piece spaced apart from the first magnetic pole piece to define a gap;
    an armature rotationally mounted within the actuator housing and disposed in the gap between the first and second magnetic pole pieces, the armature including a first end, a second end, and an opening that extends from the first end and partially into the armature;

an armature spring coupled to the armature and extending into the opening, the armature spring configured to bias the armature to a null position; and a coil mounted within the actuator housing and surrounding at least a portion of the armature, the coil disposed such that it is not surrounded by either the first magnetic pole piece or the second magnetic pole piece, the coil adapted to receive electric current and configured, upon receipt thereof, to generate a magnetic force that causes the armature to rotate.

11. The actuator of claim 10, wherein the armature spring comprises a beam spring having a first end and a second end, the first end fixedly coupled to the actuator housing, the second end fixedly coupled to the armature.

12. The actuator of claim 10, wherein the coil comprises anodized aluminum embedded in a ceramic.

13. A valve assembly, comprising:
a valve housing;
a first nozzle disposed within the valve housing;
a second nozzle disposed within the valve housing and spaced apart from the first nozzle;
a flapper element disposed between the first and second nozzles; and
a torque motor valve actuator coupled to the valve housing and configured to move the flapper element to selectively engage one of the first or second nozzles, the torque motor valve actuator comprising:
a first magnetic pole piece of a first magnetic polarity;
a second magnetic pole piece of a second magnetic polarity, the second magnetic pole piece spaced apart from the first magnetic pole piece to define a gap;
a rotationally mounted armature disposed in the gap between the first and second magnetic pole pieces and coupled to the flapper element, the armature including a first end, a second end, and an opening that extends from the first end and partially into the armature;
an armature spring coupled to the armature and extending into the opening, the armature spring configured to bias the armature to a null position; and
a coil surrounding at least a portion of the armature and disposed such that it is not surrounded by either the first magnetic pole piece or the second magnetic pole piece, the coil adapted to receive electric current and configured, upon receipt thereof, to generate a magnetic force that causes the armature to rotate and thereby move the flapper element.

14. The valve assembly of claim 13, wherein the armature spring comprises a beam spring.

15. The actuator of claim 13, wherein the coil comprises anodized aluminum embedded in a ceramic.

* * * * *